(12) United States Patent
Ollila et al.

(10) Patent No.: US 12,058,452 B2
(45) Date of Patent: Aug. 6, 2024

(54) IMAGE BLENDING

(71) Applicant: Varjo Technologies Oy, Helsinki (FI)

(72) Inventors: Mikko Ollila, Tampere (FI); Petteri Timonen, Helsinki (FI)

(73) Assignee: Varjo Technologies Dy, Helsinki (FI)

( * ) Notice: Subject to any disclaimer, the term of this patent is extended or adjusted under 35 U.S.C. 154(b) by 140 days.

(21) Appl. No.: 17/749,562

(22) Filed: May 20, 2022

(65) Prior Publication Data

US 2023/0379594 A1    Nov. 23, 2023

(51) Int. Cl.
*H04N 23/951*  (2023.01)
*G06T 5/50*  (2006.01)
*H04N 23/45*  (2023.01)
*H04N 23/67*  (2023.01)

(52) U.S. Cl.
CPC ............ *H04N 23/951* (2023.01); *G06T 5/50* (2013.01); *H04N 23/45* (2023.01); *H04N 23/67* (2023.01); *G06T 2207/20221* (2013.01)

(58) Field of Classification Search
None
See application file for complete search history.

(56) References Cited

U.S. PATENT DOCUMENTS

| 5,333,029 A | 7/1994 | Uchiyama et al. |
| 2010/0238327 A1 | 9/2010 | Griffith et al. |
| 2013/0162782 A1 | 6/2013 | Kuo et al. |
| 2015/0279073 A1* | 10/2015 | Ikeda ......................... G06T 7/97 382/190 |
| 2018/0033155 A1* | 2/2018 | Jia ........................... G06T 3/0093 |
| 2019/0250312 A1* | 8/2019 | Moon ....................... G03B 3/10 |
| 2021/0235054 A1 | 7/2021 | Silverstein |
| 2023/0094025 A1* | 3/2023 | Jiang ...................... H04N 23/69 348/333.11 |

OTHER PUBLICATIONS

European Patent Office, European Search Report, Application No. EP23170539, Dated Oct. 10, 2023, 10 pages.

* cited by examiner

*Primary Examiner* — Quan Pham
(74) *Attorney, Agent, or Firm* — Ziegler IP Law Group, LLC.

(57) ABSTRACT

An imaging system includes first camera; second camera, second field of view of second camera being wider than first field of view of first camera, wherein first field of view overlaps with portion of second field of view; and processor (s) configured to: capture first images and second images, wherein overlapping image segment and non-overlapping image segment of second image correspond to said portion and remaining portion of second field of view; determine blurred region(s) (B1, B2) of first image; and generate output image in manner that: inner image segment of output image is generated from: region(s) of overlapping image segment that corresponds to blurred region(s) of first image, and remaining region of first image that is not blurred, and peripheral image segment of output image is generated from non-overlapping image segment.

27 Claims, 3 Drawing Sheets

IMAGE BLENDING

TECHNICAL FIELD

The present disclosure relates to imaging systems for image blending. The present disclosure relates to devices for image blending.

BACKGROUND

In recent times, there has been an ever-increasing demand for image capturing and processing. Such a demand may, for example, be quite high and critical in case of immersive extended-reality (XR) environments, which are being employed in various fields such as entertainment, real estate, training, medical imaging operations, simulators, navigation, and the like. Such immersive XR environments are presented to a user of an XR device (such as an XR headset, a pair of XR glasses, or similar). Several advancements are being made to develop image capturing and processing technology.

However, existing imaging systems and devices employing camera(s) have several problems associated therewith. The existing imaging systems and devices are inefficient in terms of generating images that have an acceptably high visual quality (for example, in terms of high resolution) throughout a field of view. This is because of several reasons. Firstly, different objects in the field of view are located at different optical depths with respect to a given camera; therefore, focussing the given camera at a particular optical depth allows the objects at that particular optical depth and its depth of field to be captured clearly in a given image, whilst capturing blurry images of other objects. Secondly, lens characteristics of a camera lens of the given camera also varies across the field of view of the given camera. Moreover, a focal length of the camera lens varies as a function of the field of view of the given camera as the camera lens needs to have a high distortion (for example, such as a high negative distortion, or a high positive distortion, or a high variable distortion). Thus, an image projection on an image plane of a sensor of the given camera is difficult, even when the image plane of the sensor is curved (such as in case of a curved sensor). Thirdly, some existing imaging systems and devices are designed to generate images in a manner that the optical focus of the given camera is adjusted according to a gaze direction of a user. As an example, there might be a case where the user's gaze is off a central region of the field of view, for example, by 20 degrees, and optical depths of an object at which the user is gazing and an object present at the central region may be different. In such a case, a high visual quality is produced only in a gaze-contingent region of an image, with a relatively low visual quality in remaining region(s) (i.e., non-gaze-contingent region(s)). Such a low visual quality is not constant throughout the remaining region(s), due to varying lens characteristics across the field of view, and thus varies across the remaining region(s) as a peripheral noise (such as in a form of unnatural varying blur). Resultantly, such a noise is perceived by a user viewing the images (as a human eye is sensitive to a change or a movement in its peripheral vision). This leads to a sub-optimal (i.e., lack of realism), non-immersive viewing experience for a user viewing said images. Moreover, such a noise may also appear when gaze-tracking means fail to accurately detect the gaze direction of the user, and/or when autofocussing of the camera(s) has a considerable latency (i.e., a limited speed of autofocussing), and/or when the camera(s) have high distortion and high field curvature characteristics. Furthermore, the (generated) image could only be employed for presentation to the user, but not for other usage purposes, for example, such as generation of stereographic environment mapping (namely, depth mapping), object recognition, and the like.

Therefore, in light of the foregoing discussion, there exists a need to overcome the aforementioned drawbacks associated with the existing imaging systems and devices for generating images.

SUMMARY

The present disclosure seeks to provide an imaging system for image blending. The present disclosure also seeks to provide a device for image blending. An aim of the present disclosure is to provide a solution that overcomes at least partially the problems encountered in prior art.

In a first aspect, an embodiment of the present disclosure provides an imaging system comprising:
   a first camera having an adjustable focus;
   a second camera, a second angular resolution of the second camera being lower than a first angular resolution of the first camera, wherein a second field of view of the second camera is wider than a first field of view of the first camera, wherein the first camera and the second camera are arranged in a manner that the first field of view overlaps with a portion of the second field of view; and
   at least one processor configured to:
      control the first camera and the second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;
      determine at least one blurred region of a given first image, based on lens characteristics of the first camera at a given focal length employed for capturing the given first image, wherein the lens characteristics are indicative of how a value of a modulation transfer function of the first camera varies across the first field of view; and
      generate a given output image from the given first image and the given second image in a manner that:
         an inner image segment of the given output image is generated from at least one region of the overlapping image segment of the given second image that corresponds to the at least one blurred region of the given first image, and a remaining region of the given first image that is not blurred, and
         a peripheral image segment of the given output image is generated from the non-overlapping image segment of the given second image, the peripheral image segment surrounding the inner image segment.

In a second aspect, an embodiment of the present disclosure provides a device comprising:
   a first camera per eye, the first camera having an adjustable focus;
   at least one second camera, a second angular resolution of the at least one second camera being lower than a first angular resolution of the first camera, wherein a second field of view of the at least one second camera is wider than a first field of view of the first camera, wherein the first camera and the at least one second camera are arranged in a manner that the first field of view overlaps with a portion of the second field of view; and at least one processor configured to:

control the first camera and the at least one second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;

determine at least one blurred region of a given first image, based on lens characteristics of the first camera at a given focal length employed for capturing the given first image, wherein the lens characteristics are indicative of how a value of a modulation transfer function of the first camera varies across the first field of view; and generate a given output image from the given first image and the given second image in a manner that:

an inner image segment of the given output image is generated from at least one region of the overlapping image segment of the given second image that corresponds to the at least one blurred region of the given first image, and a remaining region of the given first image that is not blurred, and a peripheral image segment of the given output image is generated from the non-overlapping image segment of the given second image, the peripheral image segment surrounding the inner image segment.

Embodiments of the present disclosure substantially eliminate or at least partially address the aforementioned problems in the prior art, and enable generation of output images having acceptably high quality throughout the field of view, by way of efficient, accurate, reliable image blending, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 5A illustrates a conical region of interest, while

Figure 1:
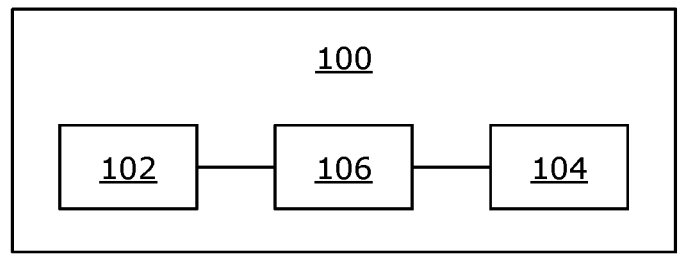
FIG. 1 illustrates a block diagram of an architecture of an imaging system for image blending, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

a first camera having an adjustable focus;

a second camera, a second angular resolution of the second camera being lower than a first angular resolution of the first camera, wherein a second field of view of the second camera is wider than a first field of view of the first camera, wherein the first camera and the second camera are arranged in a manner that the first field of view overlaps with a portion of the second field of view; and at least one processor configured to:

control the first camera and the second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;

determine at least one blurred region of a given first image, based on lens characteristics of the first camera at a given focal length employed for capturing the given first image, wherein the lens characteristics are indicative of how a value of a modulation transfer function of the first camera varies across the first field of view; and generate a given output image from the given first image and the given second image in a manner that:
an inner image segment of the given output image is generated from at least one region of the overlapping image segment of the given second image that corresponds to the at least one blurred region of the given first image, and a remaining region of the given first image that is not blurred, and
a peripheral image segment of the given output image is generated from the non-overlapping image segment of the given second image, the peripheral image segment surrounding the inner image segment.

In a second aspect, an embodiment of the present disclosure provides a device comprising:

a first camera per eye, the first camera having an adjustable focus;
at least one second camera, a second angular resolution of the at least one second camera being lower than a first angular resolution of the first camera, wherein a second field of view of the at least one second camera is wider than a first field of view of the first camera, wherein the first camera and the at least one second camera are arranged in a manner that the first field of view overlaps with a portion of the second field of view; and
at least one processor configured to:
control the first camera and the at least one second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;
determine at least one blurred region of a given first image, based on lens characteristics of the first camera at a given focal length employed for capturing the given first image, wherein the lens characteristics are indicative of how a value of a modulation transfer function of the first camera varies across the first field of view; and
generate a given output image from the given first image and the given second image in a manner that:
an inner image segment of the given output image is generated from at least one region of the overlapping image segment of the given second image that corresponds to the at least one blurred region of the given first image, and a remaining region of the given first image that is not blurred, and
a peripheral image segment of the given output image is generated from the non-overlapping image segment of the given second image, the peripheral image segment surrounding the inner image segment.

The present disclosure provides the aforementioned imaging system and the aforementioned device for image blending. Herein, the given output image is generated using different regions of the given first image (that is captured by the first camera having high angular resolution) and different image segments of the second image (that is captured by the second camera having a lower angular resolution as compared to the first camera) in a manner that the output image has an overall acceptably high visual quality (for example in terms of high resolution) throughout its field of view. As blurred region(s) of the first image are replaced with corresponding region(s) of the overlapping image segment of the second image (that are not blurred), the (generated) output image is free from any kind of noise (such as in a form of unnatural varying blur) that may be perceivable to the user. Thus, the user is provided with a realistic and immersive viewing experience. Moreover, advantageously, the output image is not only suitable for displaying purposes, but also for other usage purposes, for example such as generation of stereographic environment mapping (namely, depth mapping), object recognition, and the like. The imaging system and the device are simple, robust, fast, reliable and can be implemented with ease. Furthermore, it will be appreciated that the output image is generated in real time or near-real time (i.e., without any latency/delay) even when a gaze direction of a user is tracked with minimal accuracy, when autofocussing of the first camera has a considerable latency, and/or when the first camera has high distortion and high field curvature characteristics. Moreover, the imaging system is well-suited for generating such high visual quality output images along with fulfilling other requirements in XR devices such as small pixel size and high frame-rate requirements.

The device could be arranged at a fixed location within the real-world environment. Optionally, in such a case, the device is stationary in the real-world environment. Additionally or alternatively, the device could be a wearable device being worn by a user present in the real-world environment. In such a case, a location of such a device changes with a change in a location of its user. Likewise, the device could be arranged on, for example, a drone, a robot, a vehicle, or similar. As an example, the device could be arranged on a support structure that is capable of a three-dimensional (3D) rotation (and additionally, optionally capable of a translation motion). The support structure can be moved to any required location in the real-world environment.

As an example, the device may be implemented as a head-mounted display (HMD) device, a teleport device, and the like. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

In an example implementation, the device is implemented as an HMD device, wherein the HMD device comprises one first camera per eye and one second camera per eye. In such an implementation, a first camera and a second camera corresponding to a first eye of the user and a first camera and a second camera corresponding to a second eye of the user may be arranged to face the real-world environment in a manner that a distance between cameras corresponding to the first eye and cameras corresponding to the second eye is equal to an interpupillary distance (IPD) between the first eye and the second eye. It will be appreciated that the IPD could be an average IPD, instead of being a specific IPD of a specific user.

In another example implementation, the device is implemented as a teleport device, wherein the teleport device comprises one first camera per eye and one second camera shared between two eyes. In such an implementation, a first camera corresponding to a first eye of the user and a first camera corresponding to a second eye of the user may be arranged to face the real-world environment in a manner that a distance between cameras corresponding to the first eye and the second eye is equal to the IPD between the first eye and the second eye. Moreover, the second camera could be arranged at a centre of the IPD (i.e., in between both the first cameras).

Throughout the present disclosure, the term "camera" refers to an equipment that is operable to detect and process light signals received from the real-world environment, so as to capture a given image of the real-world environment. Optionally, a given camera is implemented as a visible-light camera. The term "given camera" encompasses the first camera, the second camera, as well as both the first camera and the second camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera. It will be appreciated that since the second field of view is wider than the first field of view, the first camera may be considered to be a narrow-angle camera, while the second camera may be considered to be a wide-angle camera.

Notably, the first camera has an adjustable focus. This means that the first camera is focusable, i.e., a focal plane of at least one optical element (for example, a camera lens) of the first camera is adjustable. Such an adjustment facilitates in capturing sharp images of objects present in the real-world environment.

In some implementations, an optical focus of the first camera is adjusted, based on an optical depth of an object that is being observed by a user. The optical depth may be determined based on a gaze direction of the user, for example, as described later. The optical focus of the first camera may be adjusted in a stepwise manner. A focus range of the first camera may provide a range of optical depths on which the first camera focuses within the real-world environment. When a given step is employed for focusing the first camera, the optical focus of the first camera is adjusted to lie at a given optical depth. In other implementations, the optical focus of the first camera is adjusted, based on a pre-defined manual setting. As an example, the optical focus of the first camera may be adjusted based on an average of gaze directions of multiple users, when the output image is to be presented to the multiple users. This may be particularly applicable in a case where the device is a teleport device. In yet other implementations, the optical focus of the first camera is adjusted, based on information pertaining to a scene of the XR environment. As an example, in an XR educational conference wherein a real object (for example, such as a jet engine) is being observed by multiple users, the optical focus of the first camera may be adjusted in a manner that the real object could be clearly observed by the multiple users.

Optionally, the first camera has a negative distortion, while the second camera has a negative distortion at the portion of the second field of view and a positive distortion at the remaining portion of the second field of view. This means that an entirety of the first field of view has the negative distortion (namely, a barrel distortion or a fish-eye distortion), whereas an overlapping portion of the second field of view (that overlaps with the first field of view) has the negative distortion and a non-overlapping portion of the second field of view (that does not overlap with the first field of view) has the positive distortion (namely, a pincushion distortion). The aforesaid types of distortion are well-known in the art.

Optionally, a value of the negative distortion of the first camera lies in a range of −20 to −70, more optionally, in a range of −30 to −50. Optionally, a value of the negative distortion of the second camera at said portion of the second field of view lies in a range of 0 to −40, more optionally, in a range of −20 to −40. Optionally, a value of the positive distortion of the second camera at the remaining portion of the second field of view lies in a range of +3 to +40, more optionally, in a range of +15 to +40. Optionally, a value of the distortion of the second camera at a boundary between the portion of the second field of view and the remaining portion of the second field of view lies in a range of −3 to +3, more optionally, in a range of −1 to +2.

It will be appreciated that for a given camera having a negative distortion across a field of view of the given camera, a focal length of the given camera would be higher at a central region of the field of view, as compared to a peripheral region of the field of view. In such a case, the focal length of the given camera may be suitably adjusted for capturing a high-resolution image corresponding to the central region of the field of view. On the other hand, for a given camera having a positive distortion across a field of view of the given camera, a focal length of the given camera would be higher at a peripheral region of the field of view, as compared to a central region of the field of view. In such a case, the focal length of the given camera may be suitably adjusted for capturing a high-resolution image corresponding to the peripheral region of the field of view. This can be attributed to the fact that a resolution (for example, in terms of pixels per degree (PPD)) is dictated by the focal length of the given camera and a pixel size of a camera sensor. Greater the focal length and lesser the pixel size, greater is the resolution.

Thus, the optical focus of the first camera can be adjusted to capture a high-resolution image of objects present in the central region of the first field of view, while the optical focus of the second camera can be adjusted to capture a high-resolution image of objects present in the peripheral region of the second field of view. As a result, the output image has an overall high visual quality throughout the field of view.

Optionally, in this regard, the second camera has an adjustable focus. This means that the second camera is focusable, i.e., a focal plane of at least one optical element (for example, a camera lens) of the second camera is adjustable. It will be appreciated that when the second camera has the positive distortion in the remaining portion of the second field of view, the second camera could have a greater focal length corresponding to the peripheral region of the second field of view, as compared to a central region of the second field of view. Therefore, focussing the second camera (namely, adjusting an optical focus of the second camera) based on real-world objects present at the peripheral region is beneficial, for example, in capturing sharp (and high-resolution) images of said objects. It will be appreciated that the second camera is designed in a manner that the optical focus of the second camera is automatically adjusted at a required focus plane corresponding to the peripheral region of the second field of view.

Alternatively, optionally, the second camera is focus free. This means that the second camera has a non-adjustable focus. In this regard, the second camera has a fixed optical focus. A focal plane of at least one optical element (for example, a camera lens) of the second camera may be fixed at a hyperfocal distance. As an example, the optical focus of the second camera may lie at an infinity. It will be appreciated that having the second camera focus free facilitates in simplifying an overall design and working of the second camera, without compromising on an image quality of the given second image. This also facilitates in implementing the imaging system with minimal complexity.

Optionally, an optical axis of the second camera is arranged at an angle that is lower than a predefined threshold angle with respect to an optical axis of the first camera, such that the first field of view fully overlaps with the portion of the second field of view. In such a case, the first field of view could be (almost) at a middle of the second field of view. Beneficially, this facilitates in easily and accurately determining image segments of the given second image as the overlapping image segment of the given second image (that corresponds to the portion of the second field of view and to the first field of view) could lie (almost) at a middle of the given second image. Optionally, the predefined threshold angle lies in a range of 5 degrees to 30 degrees. As an example, the predefined threshold angle may be from 5, 10, 15 or 20 degrees up to 10, 20 or 30 degrees. More optionally, the predefined threshold angle lies in a range of 10 degrees to 25 degrees.

Optionally, the first field of view has an angular width that lies in a range of 45 degrees to 150 degrees. As an example, the first field of view has the angular width may be from 45, 50, 60, 70, 85, 100 or 120 degrees up to 80, 90, 110, 130 or 150 degrees. More optionally, the first field of view has the angular width that lies in a range of 45 degrees to 100 degrees. Optionally, the second field of view has an angular width that lies in a range of 50 degrees to 220 degrees. As an example, the second field of view has the angular width may be from 50, 60, 75, 90, 110, 130 or 160 degrees up to 120, 135, 150, 180 or 220 degrees. More optionally, the second field of view has the angular width that lies in a range of 50 degrees to 180 degrees.

Optionally, the first angular resolution lies in a range of 20 pixels per degree to 120 pixels per degree. As an example, the first angular resolution may be from 20, 25, 35, 50, 70 or 90 pixels per degree up to 60, 80, 100 or 120 pixels per degree. More optionally, the first angular resolution lies in a range of 30 pixels per degree to 100 pixels per degree. Optionally, the second angular resolution at the overlapping image segment lies in a range of 15 pixels per degree to 100 pixels per degree, and the second angular resolution at the non-overlapping image segment lies in a range of 20 pixels per degree to 120 pixels per degree. As an example, the second angular resolution at the overlapping image segment may be from 15, 20, 30, 45, 60 or 75 pixels per degree up to 70, 80, 90 or 100 pixels per degree, and the second angular resolution at the non-overlapping image segment may be from 20, 25, 35, 50, 70 or 90 pixels per degree up to 60, 80, 100 or 120 pixels per degree.

Notably, the at least one processor controls an overall operation of the imaging system. The at least one processor is communicably coupled to at least the first camera and the second camera. The at least one processor may be understood to be a compositor (namely, a processing unit configured to perform at least compositing tasks pertaining to generation of the given output image). The compositor is a software module taking various inputs (such as the given first image and the given second image) and composing (namely, generating) the given output image (that is to be subsequently optionally displayed via the at least one light source).

The given first image and the given second image of the real-world environment are captured at a same time, via the first camera and the second camera, respectively. Notably, since the second field of view is wider than the first field of view, and the first field of view fully overlaps with the portion of the second field of view, the given first image represents a given region of a scene of the real-world environment (that corresponds to the first field of view), whereas the given second image represents other region(s) of the scene (that corresponds to the remaining (non-overlapping) portion of the second field of view), in addition to the given region of the scene.

Throughout the present disclosure, the term "image segment" of the given second image refers to a part of the given second image that corresponds to a given portion of the second field of view. The overlapping image segment of the given second image represents the given region of the scene of the real-world environment, whereas the non-overlapping image segment of the given second image represents the other region(s) of the scene. It will be appreciated that a given image segment (i.e., the overlapping image segment and/or the non-overlapping image segment) of the given second image may or may not have a defined shape and/or size.

Since the given first image and the given second image are accurately captured by the first camera and the second camera, respectively, and are readily available to the at least one processor, the at least one processor can easily determine the overlapping image segment as the overlapping image segment corresponds to the given first image itself. Optionally, in this regard, the at least one processor is configured to compare features extracted from the given first image with features extracted from the given second image, and a part of the given second image whose features correspond to the features extracted from the given first image is determined (namely, identified) as the overlapping image segment. In such a case, a remaining image segment of the given second image (that does not correspond to the given first image) is determined as the non-overlapping image segment.

Notably, since the given first image is captured by a focusable camera (i.e., the first camera), regions of the real-world environment that are in focus are clearly and sharply represented in the given first image, while regions of the real-world environment that are (even slightly) out of focus are represented in a blurred form in the given first image. Such a blurriness in the given first image could be due to a (high) negative distortion of the first camera and/or varying lens characteristics across the field of view. In this regard, the at least one processor utilizes the lens characteristics of the first camera in order to ascertain the at least one blurred region of the given first image. This is because said lens characteristics are indicative of a change in the value of the modulation transfer function of the first camera as well as a rate at which the value of the modulation transfer function changes across the first field of view (namely, across the given first image). Furthermore, the value of the modulation transfer function of the first camera (as indicated by said lens characteristics) would be different when different regions of the given first image have different visual quality. The term "blurred region" of a given image refers to a region of the given image whose visual quality (for example, in terms of contrast, angular resolution, blurriness, and the like) is considered to be unacceptable (or compromised). It will be appreciated that a variation of values of the modulation transfer function (namely, a modulation of an optical transfer function) with respect to angular widths of the first field of view could be represented by a curve. Moreover, the first camera has different lens characteristics at different focal lengths, and thus different curves could be obtained corresponding to the different focal lengths.

In an embodiment, when determining the at least one blurred region of the given first image, the at least one processor is configured to:
  detect at least one region of the given first image corresponding to which the value of the modulation transfer function of the first camera is below a predefined threshold value; and
  identify the at least one region of the given first image corresponding to which the value of the modulation transfer function is below the predefined threshold value as the at least one blurred region of the given first image.

In this regard, as the lens characteristics of the first camera are already known, the at least one processor can determine the value of the modulation transfer function of the first camera corresponding to each region of the given first image readily and accurately. Therefore, the at least one processor can easily detect for which region(s) of the given first image the value(s) of the modulation transfer function of the first camera is/are below the predefined threshold value. When the value of the modulation transfer function is below the predefined threshold value, visual quality of the at least one region of the given first image having such a value is considered to be unacceptable. Lower the value of the modulation transfer function, lower is the visual quality of the at least one region of the given first image, and vice versa. Therefore, such a region is identified as the at least one blurred region of the given first image. Optionally, the predefined threshold value lies in a range of 0.07 to 0.40. As an example, the predefined threshold value may be from 0.07, 0.10, 0.12, 0.15, 0.20 or 0.25 up to 0.11, 0.13, 0.15, 0.17, 0.22, 0.30 or 0.40. It will be appreciated that these values are in a scale of 0 to 1, wherein 1 corresponds to 100 percent. Moreover, the predefined threshold value may be a function of a frequency. In such a case, the frequency may lie between 0 and Nyquist frequency (max).

In an alternative or additional embodiment, when determining the at least one blurred region of the given first image, the at least one processor is configured to:
  detect at least one region of the given first image corresponding to which the value of the modulation transfer function of the first camera changes at a rate greater than a predefined threshold rate; and
  identify the at least one region of the given first image corresponding to which the value of the modulation transfer function of the first camera changes at the rate greater than the predefined threshold rate as the at least one blurred region of the given first image.

As mentioned earlier, as the lens characteristics of the first camera are already known, the at least one processor can determine the value of the modulation transfer function of the first camera corresponding to each region of the given first image readily and accurately. Therefore, the at least one processor can easily detect for which region(s) of the given first image the value of the modulation transfer function of the first camera changes at the rate greater than the predefined threshold rate. When the value of the modulation transfer function changes (namely, decreases) at the rate greater the predefined threshold rate at the at least one region, a rate of drop in the value of the modulation transfer function (namely, a slope of a curve representing variation of the value of the modulation transfer function of the first camera across the first field of view) is significantly high. Resultantly, visual quality of the at least one region of the given first image is considered to be unacceptable. Therefore, such a region is identified as the at least one blurred region of the given first image. Moreover, the at least one processor can determine a boundary of the at least one region accurately, based on the rate of drop and the rate of increase in the value of the modulation transfer function of the first camera. Optionally, the predefined threshold rate lies in a range of 0.01 to 0.04 per degree of field of view. It will be appreciated that these values are in a scale of 0 to 1, wherein 1 corresponds to 100 percent. Thus, 0.04 refers to 4 percent per degree, and 40 percent per 10 degrees.

Moreover, optionally, the at least one processor is configured to:
  obtain information indicative of a gaze direction;
  determine an optical depth of at least one object present in a given scene of the real-world environment, based on the gaze direction and a depth map of the given scene; and
  adjust the focal length of the first camera to focus on the at least one object, based on the optical depth of the at least one object, wherein the adjusted focal length is to be employed as the given focal length to capture the given first image.

Optionally, the at least one processor is configured to obtain, from gaze-tracking means, the information indicative of the gaze direction. In case of the imaging system, the at least one processor could be communicably coupled to an HMD comprising the gaze-tracking means. In case of the device, the gaze-tracking means could be a part of the device. The term "gaze-tracking means" refers to a specialized equipment for detecting and/or following gaze of a given eye of the user. The gaze-tracking means could be implemented as contact lenses with sensors, cameras monitoring a position, a size and/or a shape of a pupil of the given eye of the user, and the like. Such gaze-tracking means are well-known in the art. In an example, when the device is implemented as an HMD device, the gaze direction could be a gaze direction of a user using the HMD device. In another example, when the device is implemented as a teleport device, the gaze direction could be an average (namely, median) of gaze directions of multiple users using HMD devices. The term "gaze direction" refers to a direction in which the given eye of the user is gazing. The gaze direction may be represented by a gaze vector, wherein the information indicative of the gaze direction comprises the gaze vector.

Optionally, the at least one processor is configured to generate the depth map of the given scene of the real-world environment by processing depth-mapping data that is collected by depth-mapping means. In this regard, the imaging system and/or the device comprise the depth-mapping means. Herein, the term "depth map" refers to a data structure comprising information pertaining to the optical depths of the objects or their portions present in the given scene of the real-world environment. The depth map provides information pertaining to distances (namely, the optical depths) of surfaces of the objects or their portions, from a given viewpoint and a given viewing direction of the user. Optionally, the depth map is an image comprising a plurality of pixels, wherein a pixel value of each pixel indicates optical depth of its corresponding real point/region within the given scene. Optionally, the at least one processor is configured to employ at least one data processing algorithm to process the depth-mapping data for generating the depth map of the given scene of the real-world environment. The depth-mapping data may be in form of depth images, phase images, visible-light images, or similar. Correspondingly, requisite data processing algorithm(s) is/are employed to process the depth-mapping data.

According to one embodiment, the depth-mapping means comprises a specialized equipment that is employed to detect optical depths of (real-world) objects or their portions present in the given scene. Optionally, the depth-mapping means is implemented as the first camera and the second camera. In this regard, the given camera is implemented as the visible-light camera or as the combination of the visible-light camera and the depth camera. Alternatively, optionally, the depth-mapping means is implemented as at least one depth camera.

Optionally, when the depth-mapping means is implemented as the first camera and the second camera, wherein the first camera and the second camera are implemented as a first visible-light camera and a second visible-light camera, respectively, the at least one processor is configured to:
control the first visible-light camera and the second visible-light camera to capture a first visible-light image and a second visible-light image, respectively; and
process the first visible-light image and the second visible-light image to generate the depth map of the given scene of the real-world environment.

Optionally, in this regard, when processing the aforesaid images, pixels of the aforesaid images that represent a same 3D point or a same 3D region in the real-world environment are matched. Then, binocular disparities between the matched pixels of said images are determined. These binocular disparities are processed (for example, using a triangulation technique) to determine the optical depths of the objects or their portions with respect to the first visible-light camera and the second visible-light camera. It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination.

According to an alternative or additional embodiment, the depth-mapping means is implemented as the at least one processor, wherein the at least one processor is configured to utilise a 3D environment model of the real-world environment to generate the depth map of the given scene of the real-world environment from a perspective of a pose of the given camera. In such a case, the depth-mapping means may have been previously employed for generation of the 3D environment model of the real-world environment. The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a 3D surflet cloud, a 3D grid, or similar. In this regard, the imagining system optionally comprises a pose-tracking means that is employed to detect and/or follow the pose of the given camera in the 3D space of the real-world environment. The pose-tracking means may employ an outside-in tracking technique, an inside-out tracking technique, or a combination of both the aforesaid techniques, for collecting pose-tracking data. Such techniques are well-known in the art. The pose-tracking data may be in form of images, IMU/TIMU values, motion sensor data values, magnetic field strength values, or similar.

Once the gaze direction and the depth map of the given scene are available to the at least one processor, the at least one processor maps the gaze direction onto the depth map for determining the optical depth of the at least one object present in the given scene of the real-world environment. When the focal length of the first camera is adjusted to focus on the at least one object, an optical focus of the first camera is shifted correctly at the (requisite) optical depth of the at least one object, in order to clearly view the at least one object in the given first image.

Optionally, the at least one processor is configured to warp one of the given first image and the given second image to match a perspective from which another of the given first image and the given second image is captured, prior to generating the given output image from the given first image and the given second image. In this regard, since the optical axis of the first camera and the optical axis of the second camera are different, a viewpoint and a view direction of the first camera that is used to capture the given first image and a viewpoint and a view direction of the second camera that is used to capture the given second image would be different. Resultantly, there would always be some offset/skewness between the given first image and the given second image. In such a case, the at least one processor is configured to re-project (namely, warp) the one of the given first image and the given second image to match the perspective from which the another of the given first image and the given second image is captured, according to a difference in the viewpoints and the view directions of the first camera and the second camera. Beneficially, this subsequently facilitates in accurately generating the given output image. Optionally, when warping the one of the given first image and the given second image, the at least one processor is configured to employ at least one image reprojection algorithm. The at least one image reprojection algorithm comprises at least one space warping algorithm. It will be appreciated that since the second field of view is wider than the first field of view, and the first field of view fully overlaps with the portion of the second field of view, it may be preferred that the given second image is warped to match a perspective from which the given first image is captured.

Notably, a first region of the inner image segment of the given output image is generated from the remaining region of the given first image that is not blurred, and a second region of the inner image segment of the given output image is generated from the at least one region of the overlapping image segment of the given second image that corresponds to the at least one blurred region of the given first image. In this regard, the second region of the inner image segment of the given output image is generated from the at least one region of the overlapping image segment of the given second image that corresponds to the at least one blurred region of the given first image, as visual quality of the at least one region of the overlapping image segment is high as compared to visual quality of the at least one blurred region of the given first image. In other words, the at least one region of the overlapping image segment comprises more comprehensive and precise information pertaining to a given scene of the real-world environment (due to a higher visual quality), as compared to the at least one blurred region, and thus the at least one region of the overlapping image segment is preferred for the aforesaid generation instead of the at least one blurred region. Optionally, in this regard, a pixel value of a pixel in the second region of the inner image segment of the given output image is generated to be same as a pixel value of a corresponding pixel of the at least one region of the overlapping image segment of the given second image.

In addition to this, since the remaining region of the given first image that is not blurred has high visual quality (for example, in terms of high angular resolution), the first region of the inner image segment of the given output image is generated from the remaining region of the given first image that is not blurred. Optionally, in this regard, a pixel value of a pixel in the first region of the inner image segment of the given output image is generated to be same as a pixel value of a corresponding pixel of the remaining region of the given first image. It will be appreciated that the term "pixel value" of a pixel encompasses not only colour information to be represented by the pixel, but also other attributes associated with the pixel (for example, such as depth information, brightness information, transparency information, luminance information, and the like).

Furthermore, optionally, the at least one processor is configured to generate a pixel value of the pixel in the peripheral image segment of the given output image to be same as a pixel value of a corresponding pixel in the non-overlapping image segment of the given second image. Since the non-overlapping image segment of the given second image has an acceptably high visual quality, an angular resolution of the (generated) peripheral image segment would be high. The inner image segment and the peripheral image segment of the given output image are digitally combined to generate the given output image.

In an embodiment, a pixel in a transition image segment between the inner image segment and the peripheral image segment is generated by combining a corresponding pixel of the given first image with a corresponding pixel of the overlapping image segment of the given second image. It will be appreciated that said transition image segment (namely, an intermediate image segment between the inner image segment and the peripheral image segment) is generated to provide a smooth transition (namely, gradual blending or fusion) between the inner image segment and the peripheral image segment of the given output image. In other words, by generating said transition image segment, a smooth imperceptible transition is provided between the inner image segment and the peripheral image segment, as the inner image segment appears to be well-blended with the peripheral image segment when pixel(s) in the transition image segment is/are generated according to the aforesaid combination of corresponding pixels. Beneficially, this improves immersiveness and realism of user's viewing experience when the given output image is presented to the user.

Optionally, a width of the transition image segment between the inner image segment and the peripheral image segment lies in a range of 1 pixel to 100 pixels. As an example, a width (namely, thickness) of the transition image segment may be 1, 10, 20, 35 or 50 pixels up to 50, 70, 85 or 100 pixels. Alternatively, optionally, a width of the transition image segment ranges from 0.01 percent to 100 percent of a width of the inner image segment. For example, given that the width of the inner image segment is W1 pixels, the width of the intermediate image segment may be 0.0001*W1, 0.0005*W1, 0.001*W1, 0.005*W1, 0.01*W1, 0.02*W1, 0.03*W1 pixels, 0.1*W1, 0.5*W1, and the like. It will be appreciated that in some implementations, there is no intermediate image segment between the inner image segment and the peripheral image segment.

Moreover, in an embodiment, a pixel in a transition image segment between the first region and the second region of the inner image segment is generated by combining a corresponding pixel of the remaining region of the given first image with a corresponding pixel of the overlapping image segment of the given second image. It will be appreciated that said transition image segment (namely, an intermediate image segment between the first region and the second region of the inner image segment) is generated to provide a smooth transition between the first region and the second region of the inner image segment that are generated from different images. In other words, by generating said transition image segment, a smooth imperceptible transition is provided between the first region and the second region of the inner image segment, as the first region of the inner image segment appears to be well-blended with the second region of the inner image segment when pixel(s) in said transition image segment is/are generated according to the aforesaid combination of corresponding pixels. Beneficially, this facilitates in generating the inner image segment of the given output image with a high accuracy and a high visual quality, and also improves immersiveness and realism of user's viewing experience when the given output image is presented to the user.

Optionally, a width of the transition image segment between the first region and the second region of the inner image segment lies in a range of 1 pixel to 100 pixels. As an example, a width of the transition image segment may be 1, 10, 20, 35 or 50 pixels up to 50, 70, 85 or 100 pixels. Alternatively, optionally, a width of the transition image segment ranges from 1 percent to 10 percent of a width of the second region of the inner image segment. It will be appreciated that in some implementations, there is no transition image segment between the first region and the second region of the inner image segment.

Optionally, the aforesaid combination of corresponding pixels is performed by employing at least one of: Poisson blending, image blending using Laplacian pyramids, linear blending, non-linear blending, a maximum pixel value, a minimum pixel value, a simple block replacement, a max-min pixel value, a guided filtering, an average pixel value, a weighted average pixel value, a median pixel value. Techniques or algorithms for determining the aforesaid pixel values are well-known in the art, and are discussed later hereinbelow.

Optionally, the at least one processor is configured to:
assign weights to pixels of the given first image and to pixels of the overlapping image segment of the given second image, based on the lens characteristics of the first camera at the given focal length employed for capturing the given first image; and
when generating the given output image, combine the pixels of the given first image with respective ones of the pixels of the overlapping image segment of the given second image according to the assigned weights.

In this regard, a higher weight is assigned to a pixel of the given first image corresponding to which the value of the modulation transfer function of the first camera is equal to or above the predefined threshold value, as compared to a corresponding pixel of the overlapping image segment of the given second image. Exemplary range for the predefined threshold value has been already described hereinabove. Greater the value of the modulation transfer function of the first camera, greater is the weight assigned to the pixel of the given first image and lesser is the weight assigned to the corresponding pixel of the overlapping image segment of the second image, and vice versa. This is because the pixel of the given first image corresponding to a greater value of the modulation transfer function has acceptably high visual quality, as compared to the corresponding pixel of the overlapping image segment of the second image. In an example where the weights range from 0 to 1, a weight of 0.8 may be assigned to the pixel of the first image, and a weight of 0.2 may be assigned to the corresponding pixel of the overlapping image segment.

Moreover, for the pixel of the given first image (for example, such as a pixel of the at least one blurred region of the given first image) corresponding to which the value of the modulation transfer function of the first camera is below the predefined threshold value, the corresponding pixel of the overlapping image segment of the given second image is assigned a higher weight as compared to the pixel of the given first image. In an example, a weight of 0.05 may be assigned to the pixel of the first image, and a weight of 0.95 may be assigned to the corresponding pixel of the overlapping image segment.

Therefore, the at least one processor is optionally configured to generate the pixel in the transition image segment between the inner image segment and the peripheral image segment, based on a weighted sum or weighted average of a pixel value of the corresponding pixel of the given first image and a pixel value of the corresponding pixel of the overlapping image segment of the given second image. Furthermore, optionally, the at least one processor is configured to generate the pixel in the transition image segment between the first region and the second region of the inner image segment, based on a weighted sum or weighted average of a pixel value of the corresponding pixel of the remaining region of the given first image and a pixel value of the corresponding pixel of the overlapping image segment of the given second image.

Optionally, the at least one processor is configured to assign weights to the pixels of the given first image and to the pixels of the overlapping image segment of the given second image, further based on lens characteristics of the second camera at a given focal length employed for capturing the given second image. It will be appreciated that the at least one processor need not assign weights to pixels of the non-overlapping image segment of the given second image for each given output image repeatedly. This is because the pixels of the non-overlapping image segment would always have weight equal to 1 as pixels of the peripheral image segment of the given output image are generated entirely from the pixels of the non-overlapping image segment only.

Furthermore, in an embodiment, the at least one processor is configured to:
when the gaze direction is off a central axis of the first field of view by at least a predefined angle, detect whether at least one other object present in the given scene at a central portion of the first field of view is out of focus in the given first image, based on at least one of: a difference between an optical depth of the at least one other object and the optical depth of the at least one object, the lens characteristics of the first camera at the given focal length employed for capturing the given first image; and
when it is detected that the at least one other object is out of focus in the given first image,
determine at least one other blurred region of the given first image that represents the at least one other object; and
generate the given output image from the given first image and the given second image in a manner that at least one region of the inner image segment of the given output image that represents the at least one other object is generated from at least one region of the overlapping image segment of the given second image that corresponds to the at least one other blurred region of the given first image.

Optionally, in this regard, a pixel value of a pixel in the at least one region of the inner image segment of the given output image is generated to be same as a pixel value of a corresponding pixel of the at least one region of the overlapping image segment of the given second image.

When the gaze direction is off the central axis of the first field of view (namely, from a Z-axis of the first camera) by at least the predefined angle, it may be possible that the given first image represents the at least one object (that is in focus) at a (gaze-contingent) portion away from the central portion, in addition to the at least one other object (that is out of focus) at the central portion. It will be appreciated that the predefined angle may lie in a range of 10 degrees to 40 degrees. The predefined angle could be, for example, such as 10 degrees, 15 degrees, 20 degrees, 30 degrees, and the like. The predefined angle may depend on how a curvature (i.e., a focal length) of a camera lens of the first camera changes across a surface of the camera lens.

In a first case, the at least one object may be near the user's eyes or at an intermediate distance from the user eyes, while the at least one other object may be far away from the user's eyes, or vice versa. In a second case, the at least one other object may be near the user's eyes, while the at least one object may be at an intermediate distance from the user's eyes, or vice versa. In the first case, the difference between the optical depth of the at least one object and the optical depth of the at least one other object is considerably high; it is highly likely that when the first camera focusses on the at least one object, the at least one other object would be out of focus in the given first image. In the second case, the difference between the optical depth of the at least one object and the optical depth of the at least one other object is not as high as in the first case. However, it will be appreciated that the it is still highly likely in the second case that when the first camera focusses on the at least one object, the at least one other object would be out of focus in the given first image. Therefore, detecting whether at least one other object is out of focus in the given first image is not only dependent on the difference between the optical depth of the at least one other object and the optical depth of the at least one object, but also on absolute values of the optical depth of the at least one object and the optical depth of the at least one other object (namely, whether they are near, are at an intermediate distance, or are far away with respect to the user's eye).

Optionally, when an optical depth of a given object lies in a range of 10 centimetres to 100 centimetres, the given object is considered to be near the user's eyes. As an example, the optical depth of the given object may be from 10, 15 or 20 centimetres up to 25, 50, 75 or 100 centimetres. Moreover, optionally, when the optical depth of the given object is greater than 100 centimetres, the given object is considered to be far from the user's eyes. In such a case, the optical depth of the given object lies between 100 centimetres and infinity. As an example, the optical depth of the given object may be 120 centimetres, 200 centimetres, and so on. Furthermore, optionally, when the optical depth of the given object lies in a range of 60 centimetres to 120 centimetres, the given object is considered to be at an intermediate distance from the user's eyes. In such a case, the given object is present neither too near to nor too far away from the user's eyes. As an example, the optical depth of the given object may be from 60, 75 or 90 centimetres up to 90, 100 or 120 centimetres.

Additionally or alternatively, detecting whether at least one other object is out of focus in the given first image is optionally performed by utilizing the lens characteristics of the first camera. Optionally, in this regard, the at least one processor is configured to detect the at least one other object to be out of focus in the given first image when the value of the modulation transfer function of the first camera corresponding to the central portion of the first field of view is below the predefined threshold value and/or when the value of the modulation transfer function of the first camera corresponding to the central portion of the first field of view changes (namely, decreases) at the rate greater than the predefined threshold rate. Optionally, in this regard, when determining the at least one other blurred region of the given first image, the at least one processor is configured to: detect at least one other region of the given first image corresponding to which the value of the modulation transfer function of the first camera is below the predefined threshold value; and identify the at least one other region as the at least one other blurred region of the given first image. Additionally or alternatively, optionally, when determining the at least one other blurred region of the given first image, the at least one processor is configured to: detect at least one other region of the given first image corresponding to which the value of the modulation transfer function of the first camera changes at the rate greater than the predefined threshold rate; and identify the at least one other region as the at least one other blurred region of the given first image.

Moreover, optionally, the at least one processor is configured to:
  generate a given blending mask to indicate:
    regions of the given output image that are to be generated from corresponding regions of the given first image,
    regions of the given output image that are to be generated from corresponding regions of the given second image, and
    optionally, weights assigned to pixels of the given first image and to pixels of the overlapping image segment of the given second image; and
  employ the given blending mask when generating the given output image.

The term "blending mask" refers to a digital optical mask that is used to combine the given first image and the given second image for generating the given output image. Pixels of the given first image and pixels of the given second image that are to be utilized for generating corresponding pixels of the given output image are indicated on the digital optical mask, while pixels of the given first image and pixels of the given second image that are not to be utilized are left out. It will be appreciated that since the given blending mask optionally indicates the weights assigned to the pixels of the given first image and to the pixels of the overlapping image segment of the given second image, the at least one processor can accurately and realistically generate the pixels in the transition image segment between the inner image segment and the peripheral image segment (according to the assigned weights). Furthermore, the given blending mask may or may not have a defined shape and/or size. The shape and/or size of the given blending mask may depend on the given focal length of the first camera that is employed to capture the given first image. Moreover, when the value of the modulation transfer function of the first camera drops below the predefined threshold value, for example, at two different angular widths of the first field of view, the blending mask may be in a form of a dual ring blending mask.

Furthermore, optionally, the at least one processor is configured to:
  obtain information indicative of a gaze direction;
  identify a conical region of interest in a given scene of the real-world environment whose axis is the gaze direction;
  determine, based on a depth map of the given scene, optical depths of two or more objects that are present at least partially in the conical region of interest in the given scene at different optical depths;
  adjust the focal length of the first camera to focus on different ones of the two or more objects in an alternating manner, based on their corresponding optical depths, wherein the focal length of the first camera adjusted in said alternating manner is to be employed to capture consecutive first images in said sequence of first images; and
  generate two or more blending masks corresponding to the focal length adjusted according to the different optical depths of the two or more objects.

The term "conical region of interest" refers to a 3D viewing cone defined by gaze directions of the first eye and the second eye of the user. It will be appreciated that there can be a first 3D viewing cone and a second 3D viewing cone with respect to the first eye and the second eye, respectively. A given 3D viewing cone may depend on gaze tracker accuracy as well as a size of a natural human vision cone for an optical depth at which the user is gazing. The conical region of interest is a region of focus of the user's gaze within the given scene. Notably, objects lying within the conical region of interest are gaze-contingent objects. Such objects are focused onto foveae of the user's eyes, and are resolved to a much greater detail as compared to remaining object(s) present in the given scene (i.e., objects lying outside the conical region of interest).

Optionally, a shape of the conical region of interest depends on the gaze directions of the first eye and the second eye. In an example, when the gaze directions of both the first eye and the second eye are focused at a centre of the given scene, the conical region of interest may be in a shape of a right circular cone. When the gaze directions of the first eye and the second eye are focused on a point towards a given side of the given scene, the conical region of interest may be in a shape of an oblique cone. Such a given side may be a left side, a right side, a top side, a bottom side, or a corner side, of the given scene.

Optionally, an apex angle of a cone formed by the conical region of interest lies in a range of 5 degrees to 25 degrees. The term "apex angle" refers to an angle that extends between boundaries of the cone that define the apex. As an example, the apex angle of the cone formed by the conical region of interest may be from 5, 7.5, 10, 15 or 17.5 degrees up to 7.5, 10, 15, 20 or 25 degrees. In an example, the apex angle of the cone formed by the conical region of interest may be 20 degrees.

Since information pertaining to the optical depths of the two or more objects (or their portions) present in the given scene is accurately known to the at least one processor from the depth map, the optical depths of the two or more objects that are present at least partially in the conical region of interest are easily and accurately determined by the at least one processor using the depth map. It will be appreciated that for determining an optical depth of a given object from amongst the two or more objects that is present at least partially in the conical region of interest, the given object need not be identified (namely, recognized) by the at least one processor.

Optionally, when adjusting the focal length of the first camera to focus on the different ones of the two or more objects in the alternating manner, an optical focus of the first camera is switched (namely, toggled) between the different ones of the two or more objects in a frame-by-frame manner, in order to enable the user to clearly view the two or more objects in the sequence of first images. It will be appreciated that when the focal length of the first camera adjusted in said alternating manner is employed to capture the consecutive first images, multiple objects at different optical depths could be clearly and realistically represented in the (captured) consecutive first images. Beneficially, in such a case, the user would experience seamless gaze-contingency and considerable realism upon viewing said multiple objects at different optical depths in a (subsequently generated) sequence of output images. Moreover, an image quality of the sequence of output images emulates characteristics of a human visual system.

As lens characteristics of the first camera may be different for different focal lengths employed for capturing the consecutive first images, different blending masks (i.e., the two or more blending masks) are required to accurately indicate regions of output images that are to be generated from corresponding regions of the (respective) consecutive first images. Beneficially, this facilitates in employing a requisite blending mask from amongst the two or more blending masks when generating the output images corresponding to the consecutive first images.

Optionally, the at least one processor is configured to:
combine the two or more blending masks into a single blending mask; and
employ the single blending mask when generating output images corresponding to the consecutive first images.

Optionally, in this regard, the two or more blending masks are combined to retain in the single blending mask one of: a maximum, a minimum, or an average of the two or more blending masks. It will be appreciated that employing the single blending mask when generating the output images facilitates in avoiding perceivable (i.e., noticeable) flicker or disturbance in the (generated) output images due to changes in pixel values (especially in the transition image segment between the inner image segment and the peripheral image segment of the given output image). Employing the single blending mask may also enable the at least one processor in reducing processing complexity and processing time.

Moreover, optionally, the at least one processor is configured to:
determine at least one yet other blurred region of the given first image for which a corresponding region of at least one previous first image is not blurred, based on the lens characteristics of the first camera at the given focal length employed for capturing the given first image and lens characteristics of the first camera at a previous focal length employed for capturing the at least one previous first image; and
generate the given output image from the given first image, the at least one previous first image and the given second image in a manner that the inner image segment of the given output image is generated from:
the at least one region of the overlapping image segment of the given second image that corresponds to the at least one blurred region of the given first image,
the corresponding region of the at least one previous first image that is not blurred, and
the remaining region of the given first image that is not blurred.

Optionally, in such a case, the at least one processor is configured to:
generate a given blending mask to indicate:
region(s) of the given output image that are to be generated from corresponding regions of the given first image,
region(s) of the given output image that are to be generated from corresponding regions of the at least one previous first image;
region(s) of the given output image that are to be generated from corresponding region(s) of the given second image, and
optionally, weights assigned to pixels of the given first image, to pixels of the at least one previous first image and to pixels of the overlapping image segment of the given second image; and
employ the given blending mask when generating the given output image.

Additionally, optionally, the given blending mask also indicates pixel values of pixels in (namely, image data of) the aforementioned corresponding region(s) of the at least one previous first image (from which the aforementioned region(s) of the given output image are to be generated). Alternatively, optionally, the image data of the aforementioned corresponding region(s) of the at least one previous first image are provided separately in addition to the given blending mask.

Optionally, in this regard, when determining the at least one yet other blurred region of the given first image for which the corresponding region of the at least one previous first image is not blurred, the at least one processor is configured to: detect at least one yet other region of the given first image corresponding to which the value of the modulation transfer function of the first camera at the given focal length is below the predefined threshold value, whilst detecting the corresponding region of the at least one previous first image corresponding to which the value of the modulation transfer function of the first camera at the previous focal length is equal to or above the predefined threshold value; and identify the at least one yet other region as the at least one yet other blurred region of the given first image for which the corresponding region of the at least one previous first image is not blurred. The at least one previous first image is an image previous to the given first image in the sequence of first images.

It will be appreciated that the aforesaid implementation of utilizing the given first image and the at least previous first image for generating the given output image could, for example, be a case when the focal length of the first camera is adjusted in an alternating manner and is employed to capture consecutive first images in the sequence of first images. This means that the given focal length and the previous focal length could be those (adjusted) focal lengths that are employed by the first camera to focus on different ones of two or more objects in an alternating manner.

Optionally, when generating the given output image, the at least one processor is configured to combine pixels of the given first image with corresponding pixels of the at least one previous first image by using at least one of: a maximum pixel value, a minimum pixel value, a simple block replacement, a max-min pixel value, a guided filtering, an average pixel value, a weighted average pixel value, a median pixel value. Techniques or algorithms for determining the aforesaid pixel values are well-known in the art. It will be appreciated that such techniques or algorithms are simple, fast and reliable for implementation, and potentially facilitate flicker removal in the sequence of output images, without compromising its visual fidelity.

In an example, when the at least one processor uses the maximum pixel value, a maximum of a pixel value of a pixel of the given first image and a pixel value of a corresponding pixel of the at least one previous first image is selected as a pixel value of a corresponding pixel of the given output image. Moreover, when the at least one processor uses the minimum pixel value, a minimum of a pixel value of a pixel of the given first image and a pixel value of a corresponding pixel of the at least one previous first image is selected as a pixel value of a corresponding pixel of the given output image. The minimum pixel value may be used when the given first image and the at least one previous first image are dark images. When the at least one processor uses the simple block replacement, pixel values of the pixels of the given first image and pixel values of the corresponding pixels of the at least one previous first image are added, and a pixel block average is determined. The simple block replacement is based on neighbouring pixels of a given pixel. Furthermore, when the at least one processor uses the max-min pixel value, a maximum pixel value of a pixel of the given first image and a minimum pixel value of a pixel of the at least one previous first image are averaged and selected as a pixel value of a corresponding pixel of the given output image.

The present disclosure also relates to the device as described above. Various embodiments and variants disclosed above, with respect to the aforementioned first aspect, apply mutatis mutandis to the device.

Notably, the at least one processor controls an overall operation of the device. The at least one processor is communicably coupled to at least the first camera and the second camera. As an example, the device could be implemented as an HMD or a teleport device.

Optionally, the device further comprises at least one light source per eye, wherein the at least one processor is configured to display the given output image via the at least one light source. In such a case, the at least one processor is communicably coupled to the at least one light source. Upon generating the given output image, the at least one processor communicates the given output image to the at least one light source of the device, for subsequently displaying the given output image thereat. The term "light source" refers to an element from which light emanates. The at least one light source is driven to display a sequence of output images. Optionally, a given light source is implemented as a display. In this regard, a given output image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given output image is projected onto a projection screen or directly onto a retina of user's eyes. Examples of such a projector include, but are not limited to, an LCD-based projector, an LED-based projector, an OLED-based projector, an LCoS-based projector, a Digital Light Processing (DLP)-based projector, and a laser projector.

DETAILED DESCRIPTION OF THE DRAWINGS

Referring to FIG. 1, illustrated is a block diagram of an architecture of an imaging system 100 for image blending, in accordance with an embodiment of the present disclosure. The imaging system 100 comprises a first camera 102, a second camera 104, and at least one processor (depicted as a processor 106). The processor 106 is communicably coupled to the first camera 102 and the second camera 104. It may be understood by a person skilled in the art that the FIG. 1 includes a simplified architecture of the imaging system 100 for sake of clarity, which should not unduly limit the scope of the claims herein. It is to be understood that the specific implementations of the imaging system 100 are provided as examples and are not to be construed as limiting it to specific numbers or types of cameras. The person skilled in the art will recognize many variations, alternatives, and modifications of embodiments of the present disclosure. For example, the imaging system 100 may comprise more than one first camera and more than one second camera.

Figure 2A:
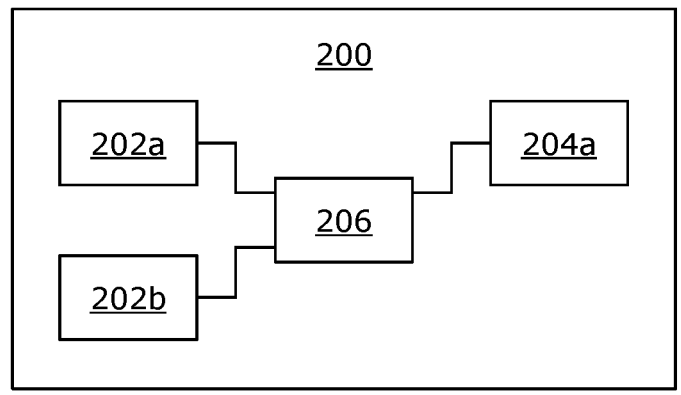
FIGS. 2A and 2B illustrate block diagrams of architectures of a device for image blending, in accordance with an embodiment of the present disclosure.
Figure 2B:
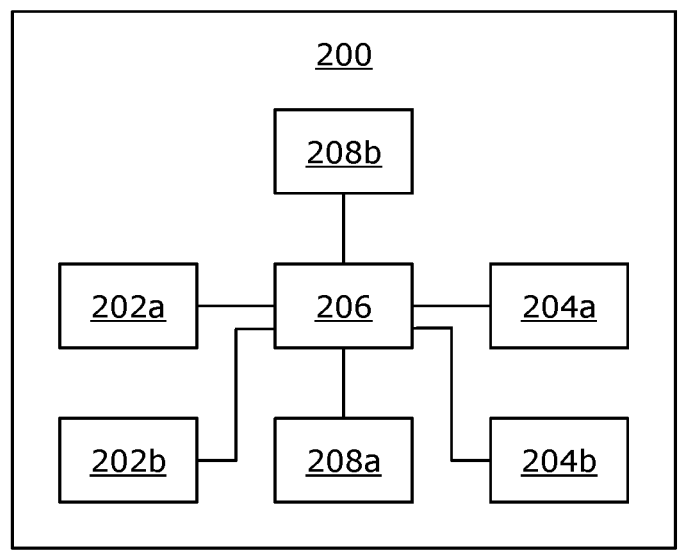

Referring to FIGS. 2A and 2B, illustrated are block diagrams of architectures of a device 200 for image blending, in accordance with an embodiment of the present disclosure. The device 200 comprises a first camera per eye (depicted as first cameras 202a and 202b for a left eye and a right eye, respectively), at least second camera (depicted as a second camera 204a in FIG. 2A, and depicted as second cameras 204a and 204b in FIG. 2B), and a processor 206. The processor 206 is communicably coupled to the first cameras 202a and 202b, and to the second cameras 204a and 204b. With reference to FIG. 2B, the device 200 optionally comprises at least one light source per eye (depicted as light sources 208a and 208b for the left eye and the right eye, respectively). It will be appreciated that in FIG. 2A, the device 200 is implemented as a teleport device, whereas in FIG. 2B, the device 200 is implemented as a head-mounted display (HMD) device. It may be understood by a person skilled in the art that FIGS. 2A and 2B include simplified architectures of the device 200 for sake of clarity, which should not unduly limit the scope of the claims herein. It is to be understood that the specific implementations of the device 200 are provided as examples and are not to be construed as limiting it to specific numbers or types of cameras and to specific numbers or types of light sources. The person skilled in the art will recognize many variations, alternatives, and modifications of embodiments of the present disclosure.

Figures 3A, 3B:
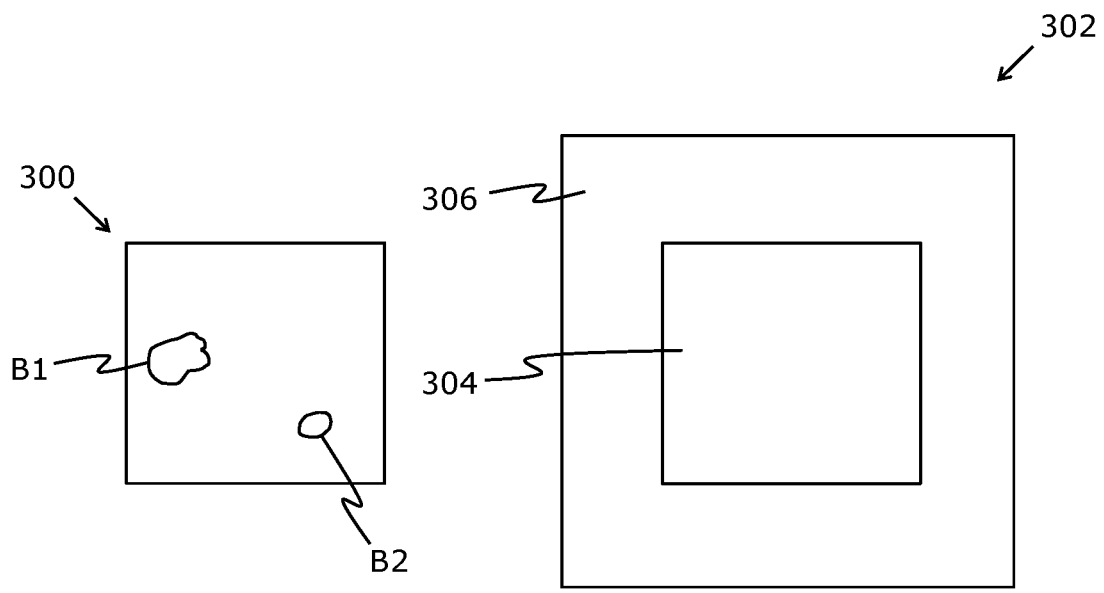
FIGS. 3A and 3B illustrate a first image and a second image, respectively, in accordance with an embodiment of the present disclosure.

Referring to FIGS. 3A and 3B, illustrated are a first image 300 and a second image 302, respectively, in accordance with an embodiment of the present disclosure. With reference to FIG. 3A, the first image 300 is captured by a first camera (not shown). The first image 300 comprises at least one blurred region (depicted as blurred regions B1 and B2). With reference to FIG. 3B, the second image 302 is captured by a second camera (not shown). The second image 302 comprises an overlapping image segment 304 and a non-overlapping image segment 306.

Figures 4A, 4B:
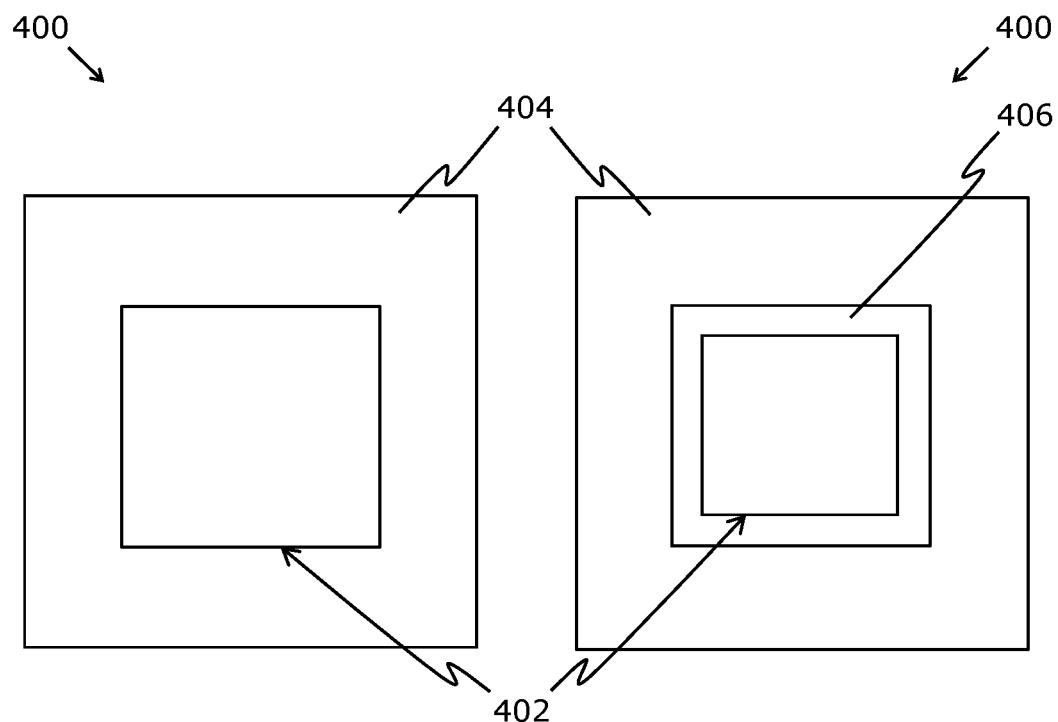
FIGS. 4A and 4B illustrate various image segments of an output image, in accordance with different embodiments of the present disclosure.

Referring to FIGS. 4A and 4B, illustrated are various image segments of an output image 400, in accordance with different embodiments of the present disclosure. The output image 400 is generated from a first image and a second image. The output image 400 comprises an inner image segment 402 and a peripheral image segment 404 surrounding the inner image segment 402. In FIG. 4B, the output image 400 further comprises a transition image segment 406 between the inner image segment 402 and the peripheral image segment 404.

Figure 5A:
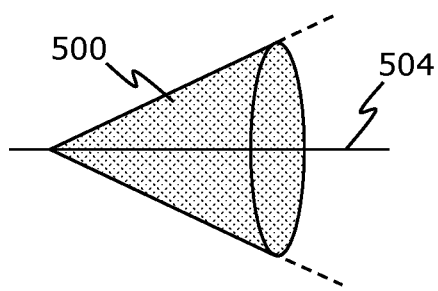
Figure 5B:
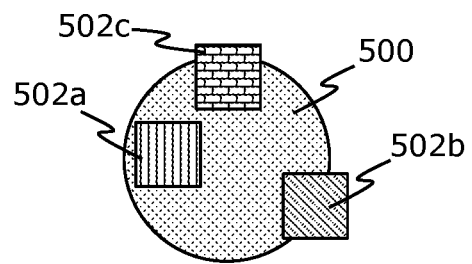
FIG. 5B illustrates various objects present at least partially in the conical region of interest, in accordance with an embodiment of the present disclosure.

FIG. 5A illustrates a conical region of interest 500 (depicted using a dotted pattern), while FIG. 5B illustrates various objects 502a, 502b, and 502c (depicted using vertical stripes pattern, diagonal stripes pattern, and bricks pattern, respectively) present at least partially in the conical region of interest 500, in accordance with an embodiment of the present disclosure. The conical region of interest 500 of FIG. 5A lies in a given scene of a real-world environment (not shown). It will be appreciated that an axis of the conical region of interest 500 is defined by a line of sight 504 of a user (not shown). In FIG. 5B, the object 502*a* is fully present in the conical region of interest 500, while the objects 502*b* and 502*c* are partially present in the conical region of interest 500. The objects 502*a*, 502*b*, and 502*c* are at different optical depths.

FIGS. 5A and 5B are merely examples, which should not unduly limit the scope of the claims herein. The person skilled in the art will recognize many variations, alternatives, and modifications of embodiments of the present disclosure.

Figure 6:
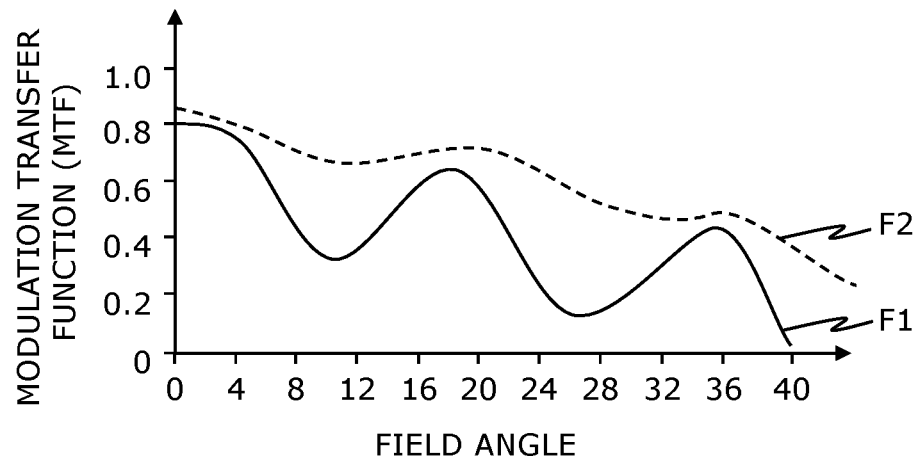
FIG. 6 illustrates an exemplary graphical representation of variation of modulation transfer function of a given camera with respect to a half-angular width of a field of view of the given camera for different focal lengths, in accordance with an embodiment of the present disclosure.

Referring to FIG. 6, illustrated is an exemplary graphical representation of variation of modulation transfer function of a given camera (not shown) with respect to a half-angular width of a field of view of the given camera for different focal lengths, in accordance with an embodiment of the present disclosure. As shown, for a focal length F1 (namely, a current focal length of the given camera employed for capturing a given image), when the half-angular width of the field of view of the given camera lies in a range of 8 degrees and 12 degrees, and in a range of 24 degrees and 28 degrees, values of the modulation transfer function (depicted using a solid line curve) drop below a predefined threshold value and/or change at a rate greater than a predefined threshold rate. In such a case, two regions of the given image (not shown) corresponding to said (dropped) values of the modulation transfer function may be identified as two blurred regions in the given image, the given image being captured by the given camera.

For a focal length F2 (namely, a previous focal length of the given camera employed for capturing a previous image), it can be observed from a trend (depicted using a dashed line curve) of the modulation transfer function that a given value of the modulation transfer function corresponding to a given half-angular width of the field of view is higher than a corresponding value of the modulation transfer function for the focal length F1. Therefore, the two blurred regions (having dropped values of the modulation transfer function) in the given image would correspond to two regions (having relatively elevated values of the modulation transfer function) in the previous image that are not blurred. In such a case, the two regions of the previous image that are not blurred, and a remaining region of the given image that is not blurred are utilized for generating an output image.

Figure 7:
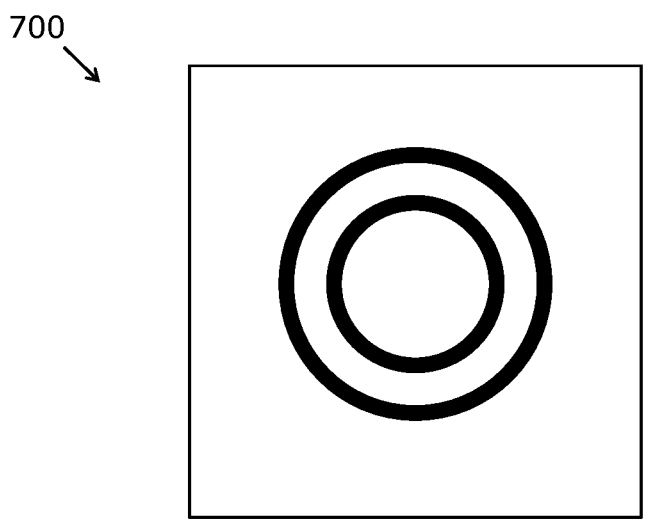
FIG. 7 illustrates an exemplary blending mask to be employed when generating an output image, in accordance with an embodiment of the present disclosure.

Referring to FIG. 7, illustrated is an exemplary blending mask 700 to be employed when generating an output image (not shown), in accordance with an embodiment of the present disclosure. The blending mask 700 is generated to indicate regions of the output image that are to be generated from corresponding regions of a first image (not shown), and regions of the output image that are to be generated from corresponding regions of a second image (not shown). Herein, two concentric black rings in the blending mask 700 indicate that regions in the output image corresponding to these rings are to be generated from corresponding regions of the second image.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging system comprising:
   a first camera having an adjustable focus;
   a second camera, a second angular resolution of the second camera being lower than a first angular resolution of the first camera, wherein a second field of view of the second camera is wider than a first field of view of the first camera, wherein the first camera and the second camera are arranged in a manner that the first field of view overlaps with a portion of the second field of view; and
   at least one processor configured to:
      control the first camera and the second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;
      determine at least one blurred region of a given first image, based on lens characteristics of the first camera at a given focal length employed for capturing the given first image, wherein the lens characteristics are indicative of how a value of a modulation transfer function of the first camera varies across the first field of view; and
      generate a given output image from the given first image and the given second image in a manner that:
         an inner image segment of the given output image is generated from:
            at least one region of the overlapping image segment of the given second image that corresponds to the at least one blurred region of the given first image, and
            a remaining region of the given first image that is not blurred, and
         a peripheral image segment of the given output image is generated from the non-overlapping image segment of the given second image, the peripheral image segment surrounding the inner image segment.

2. The imaging system of claim 1, wherein a pixel in a transition image segment between the inner image segment and the peripheral image segment is generated by combining a corresponding pixel of the given first image with a corresponding pixel of the overlapping image segment of the given second image.

3. The imaging system of claim 1, wherein a first region of the inner image segment of the given output image is generated from the remaining region of the given first image that is not blurred, and a second region of the inner image segment of the given output image is generated from the at least one region of the overlapping image segment of the given second image that corresponds to the at least one blurred region of the given first image,
   wherein a pixel in a transition image segment between the first region and the second region of the inner image segment is generated by combining a corresponding pixel of the remaining region of the given first image with a corresponding pixel of the overlapping image segment of the given second image.

4. The imaging system of claim 1, wherein the at least one processor is configured to:

assign weights to pixels of the given first image and to pixels of the overlapping image segment of the given second image, based on the lens characteristics of the first camera at the given focal length employed for capturing the given first image; and when generating the given output image, combine the pixels of the given first image with respective ones of the pixels of the overlapping image segment of the given second image according to the assigned weights.

5. The imaging system of claim 1, wherein the at least one processor is configured to:

obtain information indicative of a gaze direction;

determine an optical depth of at least one object present in a given scene of the real-world environment, based on the gaze direction and a depth map of the given scene; and adjust the focal length of the first camera to focus on the at least one object, based on the optical depth of the at least one object, wherein the adjusted focal length is to be employed as the given focal length to capture the given first image.

6. The imaging system of claim 5, wherein the at least one processor is configured to:

when the gaze direction is off a central axis of the first field of view by at least a predefined angle, detect whether at least one other object present in the given scene at a central portion of the first field of view is out of focus in the given first image, based on at least one of: a difference between an optical depth of the at least one other object and the optical depth of the at least one object, the lens characteristics of the first camera at the given focal length employed for capturing the given first image; and when it is detected that the at least one other object is out of focus in the given first image, determine at least one other blurred region of the given first image that represents the at least one other object; and generate the given output image from the given first image and the given second image in a manner that at least one region of the inner image segment of the given output image that represents the at least one other object is generated from at least one region of the overlapping image segment of the given second image that corresponds to the at least one other blurred region of the given first image.

7. The imaging system of claim 1, wherein the at least one processor is configured to:

generate a given blending mask to indicate:

regions of the given output image that are to be generated from corresponding regions of the given first image, regions of the given output image that are to be generated from corresponding regions of the given second image, and weights assigned to pixels of the given first image and to pixels of the overlapping image segment of the given second image; and employ the given blending mask when generating the given output image.

8. The imaging system of claim 1, wherein the at least one processor is configured to:

obtain information indicative of a gaze direction;

identify a conical region of interest in a given scene of the real-world environment whose axis is the gaze direction;

determine, based on a depth map of the given scene, optical depths of two or more objects that are present at least partially in the conical region of interest in the given scene at different optical depths;

adjust the focal length of the first camera to focus on different ones of the two or more objects in an alternating manner, based on their corresponding optical depths, wherein the focal length of the first camera adjusted in said alternating manner is to be employed to capture consecutive first images in said sequence of first images; and generate two or more blending masks corresponding to the focal length adjusted according to the different optical depths of the two or more objects.

9. The imaging system of claim 8, wherein the at least one processor is configured to:

combine the two or more blending masks into a single blending mask; and employ the single blending mask when generating output images corresponding to the consecutive first images.

10. The imaging system of claim 1, wherein the at least one processor is configured to:

determine at least one yet other blurred region of the given first image for which a corresponding region of at least one previous first image is not blurred, based on the lens characteristics of the first camera at the given focal length employed for capturing the given first image and lens characteristics of the first camera at a previous focal length employed for capturing the at least one previous first image; and generate the given output image from the given first image, the at least one previous first image and the given second image in a manner that the inner image segment of the given output image is generated from:

the at least one region of the overlapping image segment of the given second image that corresponds to the at least one blurred region of the given first image, the corresponding region of the at least one previous first image that is not blurred, and the remaining region of the given first image that is not blurred.

11. The imaging system of claim 10, wherein when generating the given output image, the at least one processor is configured to combine pixels of the given first image with corresponding pixels of the at least one previous first image by using at least one of: a maximum pixel value, a minimum pixel value, a simple block replacement, a max-min pixel value, a guided filtering, an average pixel value, a weighted average pixel value, a median pixel value.

12. The imaging system of claim 1, wherein when determining the at least one blurred region of the given first image, the at least one processor is configured to:

detect at least one region of the given first image corresponding to which the value of the modulation transfer function of the first camera is below a predefined threshold value; and identify the at least one region of the given first image corresponding to which the value of the modulation transfer function is below the predefined threshold value as the at least one blurred region of the given first image.

13. The imaging system of claim 1, wherein when determining the at least one blurred region of the given first image, the at least one processor is configured to:

detect at least one region of the given first image corresponding to which the value of the modulation transfer function of the first camera changes at a rate greater than a predefined threshold rate; and identify the at least one region of the given first image corresponding to which the value of the modulation transfer function of the first camera changes at the rate greater than the predefined threshold rate as the at least one blurred region of the given first image.

14. A device comprising:

a first camera per eye, the first camera having an adjustable focus;

at least one second camera, a second angular resolution of the at least one second camera being lower than a first angular resolution of the first camera, wherein a second field of view of the at least one second camera is wider than a first field of view of the first camera, wherein the first camera and the at least one second camera are arranged in a manner that the first field of view overlaps with a portion of the second field of view; and at least one processor configured to:
control the first camera and the at least one second camera to capture simultaneously a sequence of first images and a sequence of second images of a real-world environment, respectively, wherein an overlapping image segment and a non-overlapping image segment of a given second image correspond to said portion and a remaining portion of the second field of view, respectively;
determine at least one blurred region of a given first image, based on lens characteristics of the first camera at a given focal length employed for capturing the given first image, wherein the lens characteristics are indicative of how a value of a modulation transfer function of the first camera varies across the first field of view; and
generate a given output image from the given first image and the given second image in a manner that:
an inner image segment of the given output image is generated from:
at least one region of the overlapping image segment of the given second image that corresponds to the at least one blurred region of the given first image, and
a remaining region of the given first image that is not blurred, and
a peripheral image segment of the given output image is generated from the non-overlapping image segment of the given second image, the peripheral image segment surrounding the inner image segment.

15. The device of claim 14, further comprising at least one light source per eye, wherein the at least one processor is configured to display the given output image via the at least one light source.

16. The device of claim 14, wherein a pixel in a transition image segment between the inner image segment and the peripheral image segment is generated by combining a corresponding pixel of the given first image with a corresponding pixel of the overlapping image segment of the given second image.

17. The device of claim 14, wherein a first region of the inner image segment of the given output image is generated from the remaining region of the given first image that is not blurred, and a second region of the inner image segment of the given output image is generated from the at least one region of the overlapping image segment of the given second image that corresponds to the at least one blurred region of the given first image, wherein a pixel in a transition image segment between the first region and the second region of the inner image segment is generated by combining a corresponding pixel of the remaining region of the given first image with a corresponding pixel of the overlapping image segment of the given second image.

18. The device of claim 14, wherein the at least one processor is configured to:
assign weights to pixels of the given first image and to pixels of the overlapping image segment of the given second image, based on the lens characteristics of the first camera at the given focal length employed for capturing the given first image; and
when generating the given output image, combine the pixels of the given first image with respective ones of the pixels of the overlapping image segment of the given second image according to the assigned weights.

19. The device of claim 14, wherein the at least one processor is configured to:
obtain information indicative of a gaze direction;
determine an optical depth of at least one object present in a given scene of the real-world environment, based on the gaze direction and a depth map of the given scene; and
adjust the focal length of the first camera to focus on the at least one object, based on the optical depth of the at least one object, wherein the adjusted focal length is to be employed as the given focal length to capture the given first image.

20. The device of claim 19, wherein the at least one processor is configured to:
when the gaze direction is off a central axis of the first field of view by at least a predefined angle, detect whether at least one other object present in the given scene at a central portion of the first field of view is out of focus in the given first image, based on at least one of: a difference between an optical depth of the at least one other object and the optical depth of the at least one object, the lens characteristics of the first camera at the given focal length employed for capturing the given first image; and
when it is detected that the at least one other object is out of focus in the given first image,
determine at least one other blurred region of the given first image that represents the at least one other object; and
generate the given output image from the given first image and the given second image in a manner that at least one region of the inner image segment of the given output image that represents the at least one other object is generated from at least one region of the overlapping image segment of the given second image that corresponds to the at least one other blurred region of the given first image.

21. The device of claim 14, wherein the at least one processor is configured to:
generate a given blending mask to indicate:
regions of the given output image that are to be generated from corresponding regions of the given first image,
regions of the given output image that are to be generated from corresponding regions of the given second image, and
weights assigned to pixels of the given first image and to pixels of the overlapping image segment of the given second image; and
employ the given blending mask when generating the given output image.

22. The device of claim 14, wherein the at least one processor is configured to:
  obtain information indicative of a gaze direction;
  identify a conical region of interest in a given scene of the real-world environment whose axis is the gaze direction;
  determine, based on a depth map of the given scene, optical depths of two or more objects that are present at least partially in the conical region of interest in the given scene at different optical depths;
  adjust the focal length of the first camera to focus on different ones of the two or more objects in an alternating manner, based on their corresponding optical depths, wherein the focal length of the first camera adjusted in said alternating manner is to be employed to capture consecutive first images in said sequence of first images; and
  generate two or more blending masks corresponding to the focal length adjusted according to the different optical depths of the two or more objects.

23. The device of claim 22, wherein the at least one processor is configured to:
  combine the two or more blending masks into a single blending mask; and
  employ the single blending mask when generating output images corresponding to the consecutive first images.

24. The device of claim 14, wherein the at least one processor is configured to:
  determine at least one yet other blurred region of the given first image for which a corresponding region of at least one previous first image is not blurred, based on the lens characteristics of the first camera at the given focal length employed for capturing the given first image and lens characteristics of the first camera at a previous focal length employed for capturing the at least one previous first image; and
  generate the given output image from the given first image, the at least one previous first image and the given second image in a manner that the inner image segment of the given output image is generated from:
    the at least one region of the overlapping image segment of the given second image that corresponds to the at least one blurred region of the given first image,
    the corresponding region of the at least one previous first image that is not blurred, and
    the remaining region of the given first image that is not blurred.

25. The device of claim 24, wherein when generating the given output image, the at least one processor is configured to combine pixels of the given first image with corresponding pixels of the at least one previous first image by using at least one of: a maximum pixel value, a minimum pixel value, a simple block replacement, a max-min pixel value, a guided filtering, an average pixel value, a weighted average pixel value, a median pixel value.

26. The device of claim 14, wherein when determining the at least one blurred region of the given first image, the at least one processor is configured to:
  detect at least one region of the given first image corresponding to which the value of the modulation transfer function of the first camera is below a predefined threshold value; and
  identify the at least one region of the given first image corresponding to which the value of the modulation transfer function is below the predefined threshold value as the at least one blurred region of the given first image.

27. The device of claim 14, wherein when determining the at least one blurred region of the given first image, the at least one processor is configured to:
  detect at least one region of the given first image corresponding to which the value of the modulation transfer function of the first camera changes at a rate greater than a predefined threshold rate; and
  identify the at least one region of the given first image corresponding to which the value of the modulation transfer function of the first camera changes at the rate greater than the predefined threshold rate as the at least one blurred region of the given first image.

* * * * *